Dec. 4, 1962 B. FRÖHLICH 3,066,990
DEVICE FOR BEARINGS, ESPECIALLY FOR INCREASING THE PRESSURE
OF LUBRICANT LIQUID BETWEEN BEARING OR SLIP RING
SURFACES SLIDING ONE UPON THE OTHER
Filed Feb. 23, 1960 4 Sheets-Sheet 1
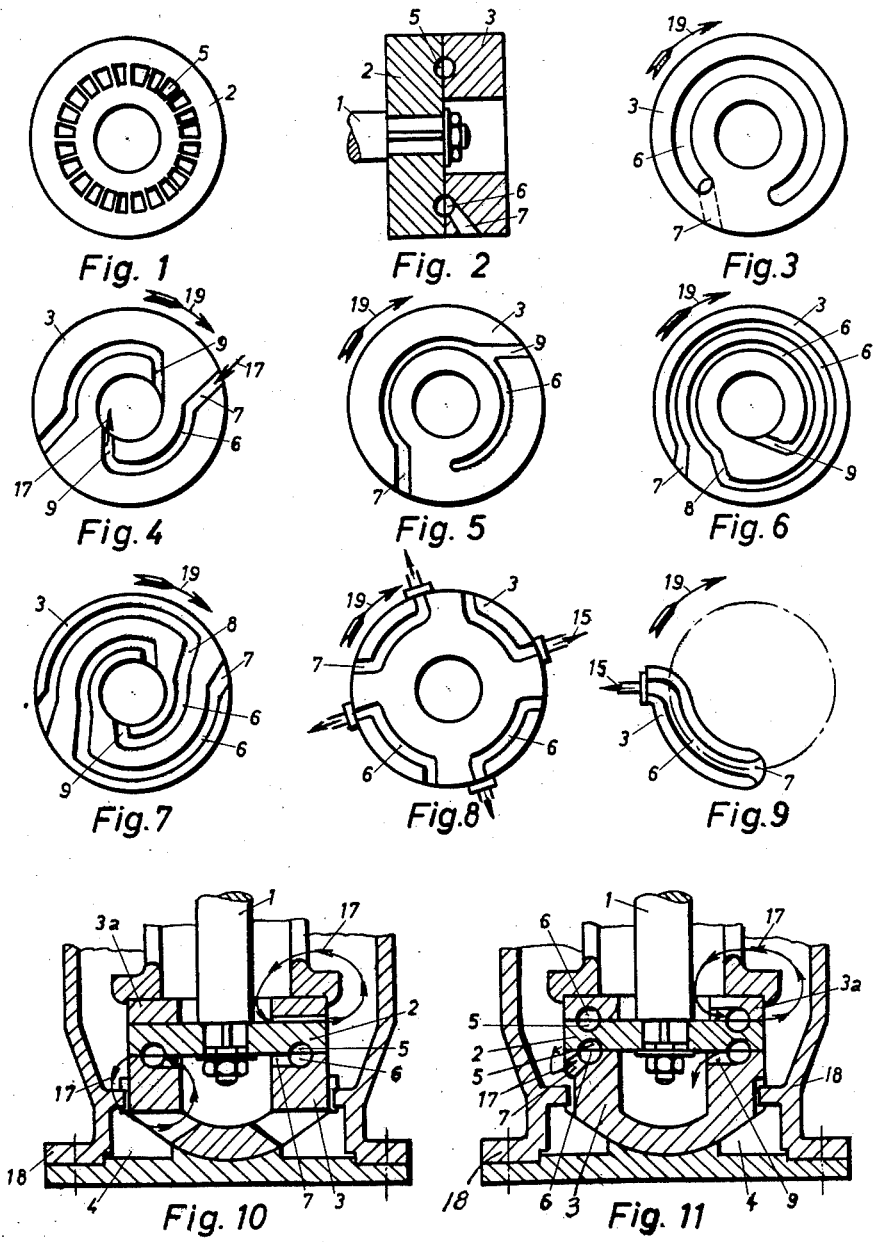
INVENTOR
BRUNO FRÖHLICH
BY Robert H. Jacob
AGT.

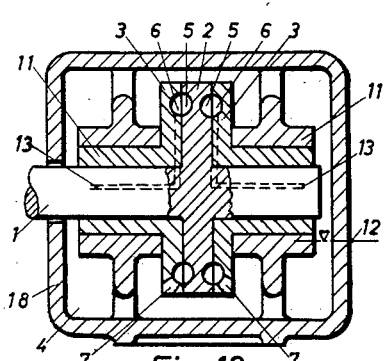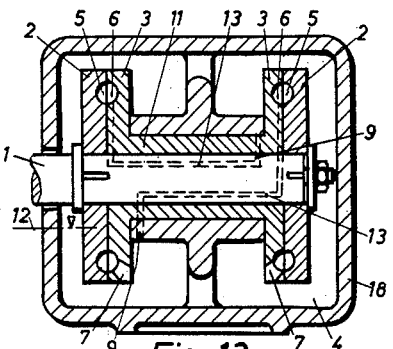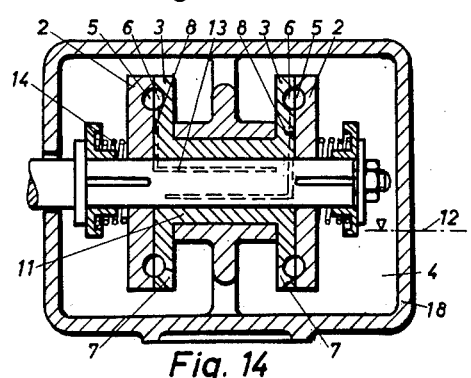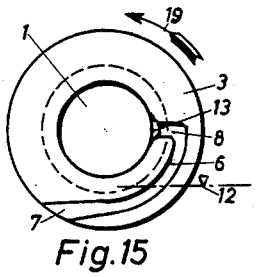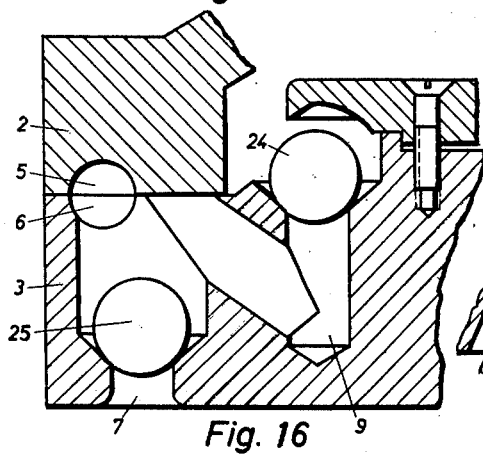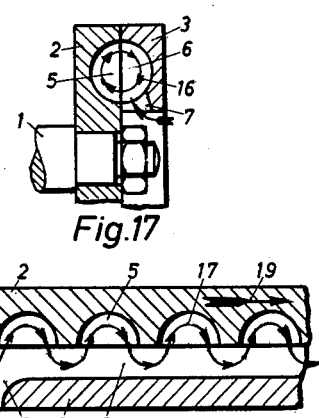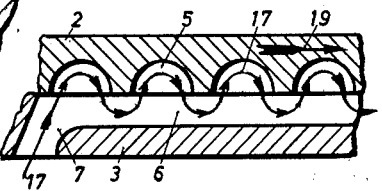

Dec. 4, 1962  B. FRÖHLICH  3,066,990
DEVICE FOR BEARINGS, ESPECIALLY FOR INCREASING THE PRESSURE
OF LUBRICANT LIQUID BETWEEN BEARING OR SLIP RING
SURFACES SLIDING ONE UPON THE OTHER
Filed Feb. 23, 1960  4 Sheets-Sheet 3

INVENTOR
BRUNO FRÖHLICH
BY Robert H. Jacob
AGT.

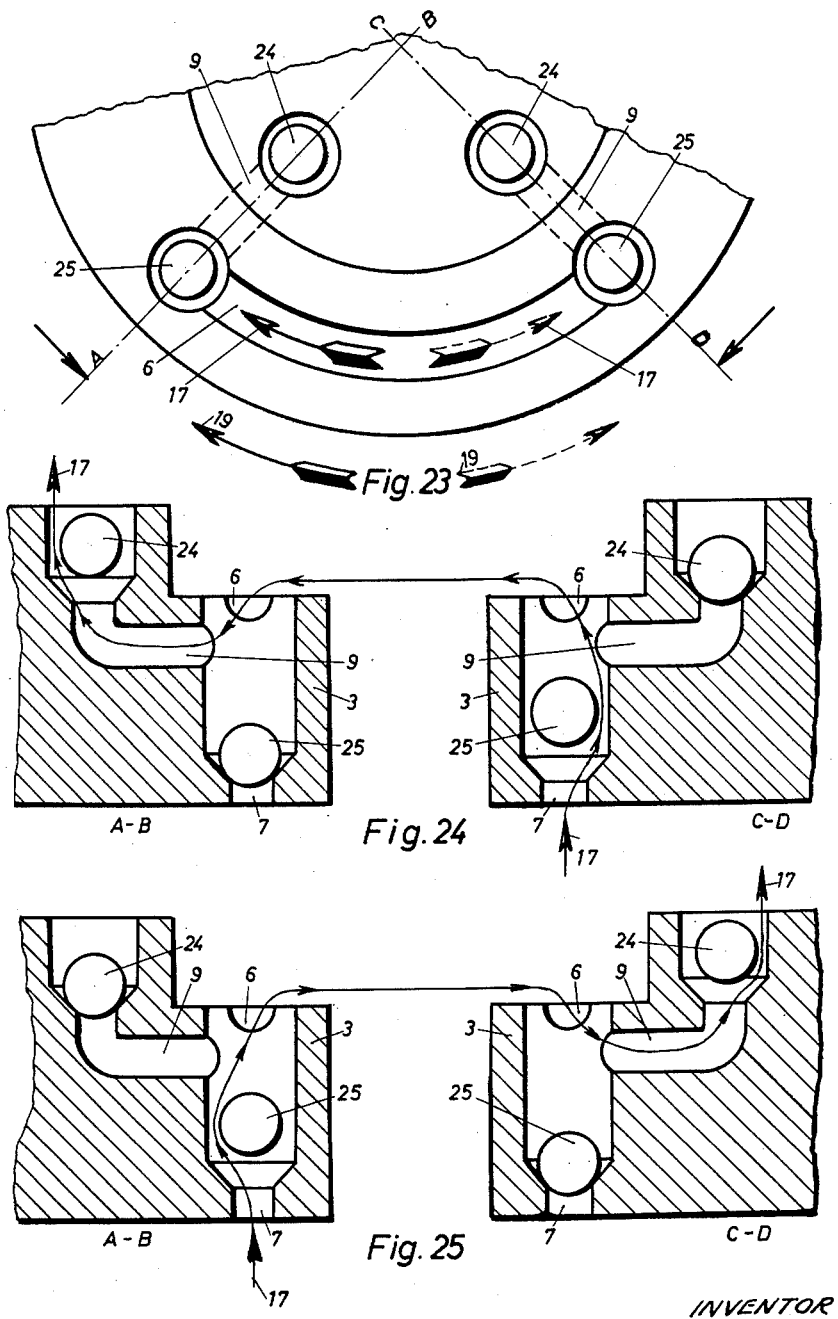

United States Patent Office 3,066,990
Patented Dec. 4, 1962

3,066,990
DEVICE FOR BEARINGS, ESPECIALLY FOR INCREASING THE PRESSURE OF LUBRICANT LIQUID BETWEEN BEARING OR SLIP RING SURFACES SLIDING ONE UPON THE OTHER
Bruno Fröhlich, Backergasse 94, Berg,
near Starnberg, Germany
Filed Feb. 23, 1960, Ser. No. 10,176
Claims priority, application Germany Feb. 28, 1959
13 Claims. (Cl. 308—168)

In known bearing systems, for example simple thrust bearings, radially acting plain bearings, and slip ring packings, the lubricant is drawn through the moved bearing part or slip ring between the sliding surfaces, and lubricates the latter. If only water can be used as lubricant, the thickness of the lubricant film is often inadequate in the case of high stresses, which has a disadvantageous effect upon the life of the machine.

The present invention relates to a device for bearings and especially to a device which can be used on rotating bearings in order to achieve an increase of the pressure of lubricant liquid between surfaces sliding upon one another. The invention can also be applied to bearing systems wherein the pressure of the lubricant is reduced, in order for example to achieve a suction of the lubricant.

According to the present invention, there is provided at least one circular row of cells in the movable bearing or slip ring parts, with which there is associated in the opposite, stationary parts of the bearing or slip ring at least one annular groove connected with the lubricant liquid, in which groove, on rotation of the opposite ring of cells, an increase of pressure of the lubricant liquid is effected.

In many cases the aforementioned annular groove in the stationary bearing parts can at the same time fulfill the task of a lubricant groove, and in the device according to the invention the lubricant pressure is already greatly increased within this lubricant groove, so that the lubricant is forced under excess pressure between the bearing faces sliding upon one another.

In experiments with devices according to the invention it has been possible to achieve for example a lubricant pressure which was about five to fifteen times as great as the pressure which can be produced by a rotary pump impeller of the same diameter and same speed of rotation.

The device in accordance with the invention can be used for any liquid lubricant, that is to say not only for oil, but also for example for water as lubricant liquid, as is usual, for example, in the bearings of pumps and immersed pump motors.

In general a device according to the invention can be constructed and used in various ways. Thus for example it is possible to use a device according to the invention only for the improvement of the lubrication of the bearing where a device according to the invention is arranged. Here the ring of cells in the rotating part and the annular lubricant groove in the stationary part can be so constructed and dimensioned that between the two parts a strong axial thrust is produced by the pressure of the lubricant, which opposes the axial stressing of the bearing. The surfaces which slide upon one another are lifted away from one another by this axial thrust, and between them there forms a thicker lubricant film than what is normally possible.

However it is also possible to construct the device according to the invention in such fashion that a very great quantity of lubricant is set in circulation, which is used for the cooling of the machine parts. On the other hand it is also possible within the scope of the invention to utilize the produced lubricant pressure also for the supplying of further bearings or bearing parts.

With a device in accordance with the invention it is possible to produce such a high lubricant pressure within the bearing or within the lubricant groove, that the device according to the invention constitutes a pressure-lubricating plant, which is connected through conduits or channels with any desired bearings and supplies these with lubricant under pressure. Pressure-watchers or supervising apparatus (manometers or warning installations) can be connected directly to the lubricating groove of the bearing. It is also possible to conduct the lubricant through a re-cooling installation or through a filter. It is therefore, also possible to supply a higher situated bearing or a plurality of bearings at the same time with the lubricant, from one cell-ring wheel. Furthermore the possibility exists of tapping the lubricant groove and branching off large quantities of lubricant from the tapping point, for example for the cooling of the bearings, while at the end of the lubricant groove a high lubricant pressure is available for the bearing lubrication and/or for the hydraulic relief. Furthermore bearing surfaces can be supplied with lubricant without the cell-ring wheel having to take up an axial stress.

The invention is illustrated by way of example in the accompanying drawings in which:

FIGURES 1 to 3 show a device according to the invention providing a plan view of the cell-ring wheel, a cross-section thereof and a plan view of the stationary abutting ring;

FIGURES 4 to 9 shows various embodiments of lubricant grooves in the abutting rings;

FIGURES 10 and 11 show two embodiments of thrust bearings with vertical shaft;

FIGURES 12 to 14 show three embodiments of horizontal thrust bearings in longitudinal section;

FIGURE 15 is a plan view of the abutting ring of a horizontal thrust bearing;

FIGURE 16 shows a modified device according to FIGURE 11 constructed for right-hand and left-hand running, in an enlarged partial section;

FIGURE 17 is a partial section through a pressure-increasing arrangement according to the invention;

FIGURE 18 shows a development of the cell-ring and of the lubricant groove according to FIGURE 17, in section;

FIGURE 23 is an amplificatory representation of the example of embodiment according to FIGURE 16, in plan view;

FIGURE 24 is a section along the lines A—B, C—D in FIGURE 23 in the case of right-hand running of the machine, and FIGURE 25 is a section along the lines A—B, C—D in the case of left-hand running of the machine.

Figure 19:
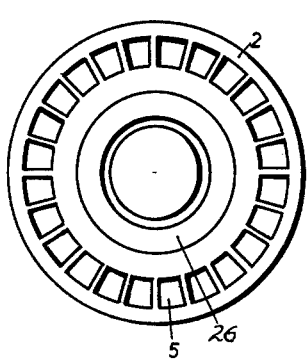
FIGURE 19 is a plan view of the cell-ring wheel of a slip ring packing.

In the graphic embodiment according to FIGURES 1 to 3, 1 designates a rotating shaft, on the end of which there is secured the wheel or disc 2 illustrated in plan view in FIGURE 1, which wheel is provided with a ring of cells 5 in the form of corresponding depressions. In FIG. 3 the stationary abutting ring 3 is illustrated in plan view, which is provided in the region of the surface opposite to the cell ring 5 with an anular groove 6, which is connected through the entry opening 7 from the outside of the wheel 3 with the lubricant. On rotation of the shaft 1 and of the wheel 2 the lubricant entering through the entry opening 7 is brought to high pressure in the annular groove 6. Due to this pressure this lubricant penetrates between the faces of the wheels 2 and 3 which face one another, and thus supplies these faces with lubricant, it being possible also for a significant axial thrust to be produced by the pressure of the lubricant between the wheels 2 and 3, which thrust can be utilized to overcome the axial stressing, for example of a thrust or step bearing or of a slip ring of a slip ring packing. In the case of the embodiment according to FIGURES 1 to 3 the lubricant groove 6 is only provided with the entry opening 7, so that also the lubricant can only pass between the surfaces of the wheels 2 and 3.

In the embodiment according to FIGURES 1 to 3 and in all other embodiments the arrow 19 indicates that direction in which the cell-ring wheel 2 rotates in relation to the abutting wheel 3.

FIGURES 4 to 9 show some examples of how by the arrangement and construction of the lubricant grooves 6 in the abutting wheels 3 the pressure increase of the lubricant or the quantity of lubricant subjected to the pressure increase can be adapted to the different requirements of the bearing lubrication in each case. Thus for example in the graphic representation in FIGURE 4, two lubricant grooves 6 are arranged, acting parallel with one another, in the abutting wheel 3, the lubricant being sucked from the exterior through the entry openings 7 and being able to escape inwardly through the outlet openings 9.

In the embodiment according to FIGURE 5 only one annular groove 6 is provided, but this is tapped through an outlet channel 9 before its dead end, whence the lubricant can be conducted for example to any desired other bearings.

In the embodiments according to FIGURES 6 and 7, in the abutting wheel 3 a plurality of lubricant grooves 6 are arranged one behind the other. In each case 8 designates connection channels, whence the lubricant passes from one lubricant groove into the next.

In the embodiment according to FIGURE 8, in the vicinity of the outer edge of the abutting wheel 3 there are arranged four lubricant grooves 6, which can be connected in each case with any desired lubrication positions, by their outlet openings, through conduits 15.

FIGURE 9 shows an embodiment wherein an actual abutting wheel 3 is omitted and the lubricant groove 6 is provided merely in a stationary part opposite the cellring wheel 2 (not shown) rotating in the direction of rotation of the arrow 19. The part receiving the lubricant groove 6 is here made in segment style, and such a device can be used for example in the case of gears where a cellring wheel 2 is arranged on a lower gear wheel, producing in the lubricant groove 6 a lubricant pressure for supplying higher gear wheels or higher situated bearings with lubricant.

It should be pointed out that in the embodiment according to FIGURES 4 to 9, the basis in each case is that opposite the lubricant grooves 6 in the stationary abutting wheels 3 there are disposed in each case corresponding rings 5 of cells in the relevant cell-ring wheels 2 (not shown).

In the embodiment according to FIGURE 10 there is illustrated in section a thrust bearing of a motor, for example for an immersed pump, which bearing in most cases is supplied with water as lubricant through a water supply, the water supply in the motor or in the thrust bearing being closed off to the exterior. The cell-ring wheel 2 secured on the shaft 1 here runs between the stationary upper and lower abutting rings 3a and 3. The cell-ring wheel 2 is provided on the under-side with a ring of cells 5, for example according to FIGURE 1, and opposite the ring of cells 5 there is situated in the lower abutting ring 3 a lubricant groove 6, for example of the shape illustrated in FIGURE 3. A collecting chamber 4 is provided for the lubricant, whence the lubricant passes through the feed channel 7 into the lubricant groove 6. In the lubricant groove 6 the lubricant is brought to pressure on rotation of the cells 5 with the wheel 2, and forced between the surfaces of the wheel 2 and of the ring 3 which slide upon one another. Due to the pressure the wheels are lifted somewhat apart, and then the lubricant flows through the gap between these wheels back into the collecting chamber 4. Thus the axial thrust produced between the wheels 2 and 3 relieves the illustrated thrust bearing of the existing axial forces. The arrow 17 indicates the generated rotary flow of the lubricant. If upwardly directed axial forces are also to be taken up by the bearing, the upper side of the cell-ring wheel 2 can also be equipped with a cell-ring 5 and the upper abutting ring 3a can be equipped with a corresponding lubricant groove 6.

In the embodiment according to FIGURE 11 the lower abutting ring 3 is designed after the style of a unilaterally closed bell, into the inner cavtity of which the lubricant, brought to pressure, is conducted through the discharge channel 9. Thus the lubricant pressure produced by the device of the invention acts upon the entire surface of the cell-ring wheel 2. Lubricant pressure and quantity can be so great, in the case of appropriate cell-ring construction, that the cell-ring wheel 2 floats on a thick film of lubricant which occurs between the wheel 2 and the lower shell 3. This lubricant film and the axial pressure generated between the wheels 2 and 3 takes up hydraulically the axial load to be carried by the bearing.

In the case of the horizontal thrust bearings according to FIGURES 12, 13 and 14 the shaft 1, which is equipped with the cell-ring wheels 2, runs in the bearing shells 11, the bearing shells having abutting wheels 3 with lubricant grooves 6. The bearing housings 18 have oil collecting chambers 4, which are filled with lubricant up to the oil level 12. In operation, the lubricant flows through the supply channels 7 into the lubricant grooves 6, is there taken up by the cell rings 5, brought to pressure and forced between the surfaces sliding one upon the other. It can also be conducted into the bearing lubricant grooves 13 for the lubrication of the radial bearing of the shaft 1.

In the case of the bearing arrangement illustrated in FIGURE 12, a cell-ring wheel 2 is firmly arranged on the shaft 1.

FIGURES 13 and 14 show bearings wherein the shaft 1 is equipped with two cell-ring wheels 2. In the case of the bearing according to FIGURE 14 the two cell-ring wheels 2 are however axially movably arranged and are pressed by springs 14 against the abutting wheels 3. The springs 14 in operation regulate the lubricant pressure and prevent the attainment of undesirably high pressures. In the case of excessively high lubricant pressure the cellring wheels 2 are shifted on the shaft 1, the gap between the cell-ring wheel 2 and the abutting wheel 3 becoming greater, so that the excess lubricant can flow out freely.

In FIGURE 15 there is illustrated in end view an abutting wheel 3 with lubricant groove 6, which can be used in the bearings according to FIGURES 12 to 14. FIGURE 16 shows on an enlarged scale and in a partial view a cross-section through a cell-ring wheel 2 and an abutting wheel 3, there being provided in the stationary abutting wheel 3 at the commencement and at the end of the lubricant groove 6 in each case an exit aperture 9 and an entry aperture 7. The two entry apertures 7 of each lubricant groove 6 are each controlled by a suction valve 25 and the two exit apertures 9 are each controlled by an over-pressure valve 24. Such an arrangement of suction and pressure valves at the two ends of the lubricant groove 6 of the stationary wheel is advisable in the case of machines according to FIGURE 11, if a change of direction of rotation is to be expected. By means of the valves 24 and 25 the object is here achieved that in the case of one direction of rotation the one suction valve 25 at the suction end of the lubricant groove 6 is opened and the associated over-pressure valve 24 is closed. At the pressure end of the lubricant groove the suction valve 25 is closed and the over-pressure valve 24 is opened. If in the case of such a modification of a machine according to FIGURE 11 the direction of rotation changes, the suction valve 25 closes at the former suction end and the suction valve 25 opens at the other end of the lubricant groove, and the direction of flow of the lubricant in the lubricant groove 6 is reversed. Nevertheless the lubricant is subjected to an increase of pressure.

In FIGURES 23 to 25 the entry and exit apertures 7 and 9 and the valves 24 and 25 are illustrated in the various positions in the case of right-hand running of the machine (FIGURE 24) and in the case of left-hand running (FIGURE 25). In this illustration also the arrow 17 designates in each case the rotary flow of the lubricant.

Embodiments of the invention which are constructed for example according to FIGURE 3 can be constructed for both directions of rotation by providing the lubricant groove at both ends with supply and discharge openings 7 and 9 respectively, in which in each case only one suction valve 25 is provided.

The graphic representations in FIGURES 17 and 18 are intended to explain theoretically and diagrammatically the operations occurring in a device according to the invention. The operation may be conceived in that a drop of water which arrives in the lubricant groove 6 of the abutting wheel 3 and thence through a water eddy in a cell of the cell-ring wheel 2, is entrained by the latter. It thus receives a peripheral velocity which is almost as great as that of the cell-ring wheel 2. Since the water in the lubricant groove 6 flows only very slowly, a rotating eddy occurs in every cell with the pertinent section of the lubricant groove 6. The water drop is thrown out of the cell and imparts its energy to the water situated in the lubricant groove 6, and increases the pressure thereof. The same drop is then accelerated again by the next cell, and so on. This repeated acceleration of the water drop, with the subsequent conversion of the kinetic energy into pressure energy, takes place as long as the drop is situated in the lubricant groove 6. The longer the lubricant groove 6 and the more often the drop is accelerated, the greater will be the attainable lubricant over-pressure.

Figure 20:
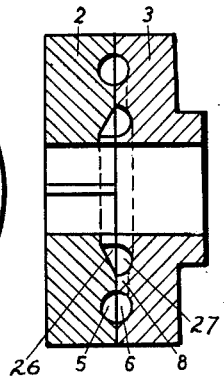
FIGURE 20 shows a slip ring packing in cross-section.
Figure 21:
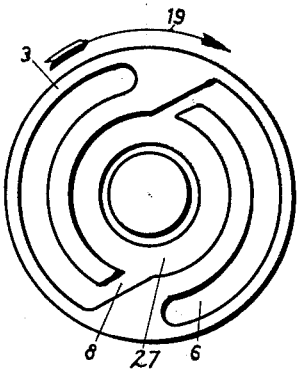
FIGURE 21 is a plan view of the stationary abutting ring of a slip ring packing according to FIGURE 20.
Figure 22:
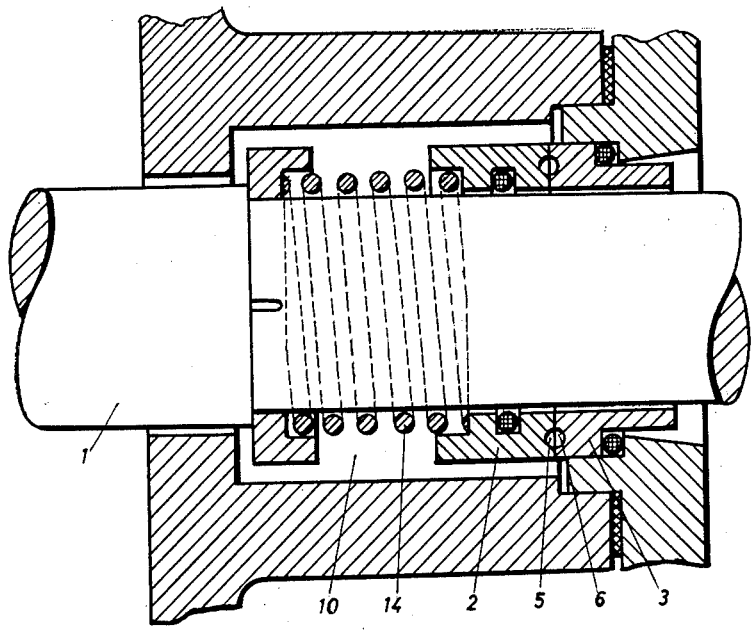
FIGURE 22 shows a slip ring packing in longitudinal section, on an enlarged scale.

In the embodiment of a slip ring packing according to the invention, as explained in FIGURES 19 to 22, with the shaft 1 for example of a rotary pump (not shown) there rotates a cell-ring wheel 2, which possesses a cell-ring 5 and possibly a lubricant-collecting chamber 26. The cell-ring wheel 2 is pressed by a pressure spring 14 in FIGURE 22 upon the stationary abutting ring 3. The abutting ring is provided with the lubricant groove 6 and possibly also a lubricant collecting chamber 27.

In this form of embodiment of the invention the lubricant is brought to pressure in the groove 6 by the cell-ring 5 on rotation of the ring wheel 2, and forced between the sealing surfaces of the wheels 2 and 3. Through the gap occurring between the sealing surfaces the lubricant in part comes into the lubricant collecting chamber 26, 27. Here it is thrown outwardly by the centrifugal force, and passes by way of the channel 8 transversely into the commencement of the lubricant groove 6. Here the lubricant is again taken up by the cell-ring 5, and brought to pressure. Thus no lubricant can escape outwardly along the shaft 1. If the lubricant pressure is greater than the pressure in the stuffing box chamber 10, then at the end of the lubricant groove 6 there can be arranged a lubricant outflow channel 9, for example according to FIGURE 5, in the abutting ring 3. If in the case of a single-stage cell-ring arrangement the lubricant pressure in the cell-ring or in the lubricant groove is not to rise so high that the pressure in the stuffing box chamber 10 can be overcome, a plurality of cell rings 5 with corresponding opposite lubricant grooves 6 should be used.

The invention is not limited to the particular constructions described above. Thus for example the cell rings 5 can be arranged in the region of the inner edge or also in the region of the outer edge of the rotating cell-ring disks or wheels, corresponding lubricant grooves in each case standing opposite them in the opposite stationary abutting wheels.

By repeatedly placing lubricant grooves and cell-rings in series, very high pressures can be produced, and the lubricant quantity may be increased and adapted to requirements, by the parallel connection of a plurality of cell-rings and lubricant grooves. The dimensioning of the size, cross-sections and other constructions of lubricant grooves and cell-rings may be adapted in each case to the existing conditions of the individual case.

In accordance with the present invention, it is not only possible to obtain an increase in the lubricant pressure and an improvement of the lubrication, but it is also possible to effect a relief of axial stresses by the pressure of the lubricant liquid, produced between the surfaces which slide upon one another. The hydraulic relief thus achieved in general reduces the specific loading of the sliding faces and the friction losses, and increases the reliability and the life of the bearings.

In general it is also possible to arrange a plurality of cell-ring wheels or disks on one shaft, one above the other, if the axial pressures to be taken up are especially great.

Since the lubricating rings known heretofore deliver no appreciable quantities into a horizontal bearing, only oil lubrication has been provided for such bearings. With the device according to the invention it is possible to use water as lubricant even in the case of horizontal bearings, and to supply it under pressure to the bearing positions.

I claim:

1. Means for increasing the pressure of lubricant between adjacent bearing surfaces of a bearing of the type comprising a rotatable member and a stationary member immersed in a lubricant, said means comprising cooperating configurations for developing pressure in the lubricant in response to rotation of said rotatable member and including at least one circular row of closely adjacent cells in the surface of said rotatable member open solely toward said stationary member and at least one groove in the adjacent surface of said stationary member, said groove having an arcuate portion registering with a portion of said row of cells and extending generally around the axis of rotation of said rotatable member to form an annular section.

2. Means for increasing the pressure of lubricant between adjacent bearing surfaces of a bearing of the type comprising a rotatable member and a stationary member immersed in a lubricant, said means comprising cooperating configurations for developing pressure in the lubricant in response to rotation of said rotatable member and including at least one circular row of closely adjacent cells in the surface of said rotatable member open solely toward said stationary member and at least one groove in the adjacent surface of said stationary member, said groove having a portion registering with a portion of said row of cells and extending in an arcuate path circumferentially around the axis of rotation of said rotatable member to form an annular section and having an opening at one end.

3. Means for increasing the pressure of lubricant between adjacent bearing surfaces of a bearing of the type comprising a rotatable member and a stationary member immersed in a lubricant, said means comprising cooperating configurations for developing pressure in the lubricant in response to rotation of said rotatable member and including at least one circular row of closely adjacent cells in the surface of said rotatable member open solely toward said stationary member and at least one groove in the adjacent surface of said stationary member, said groove having a portion registering with a portion of said row of cells and extending in an arcuate path circumferentially around the axis of rotation of said rotatable member to form an annular section and having an outlet opening for the lubricant.

4. Means for increasing the pressure of lubricant between adjacent bearing surfaces of a bearing of the type comprising a rotatable member and a stationary member immersed in a lubricant, said means comprising cooperating configurations for developing pressure in the lubricant in response to rotation of said rotatable member and including at least one circular row of closely adjacent cells in the surface of said rotatable member open solely toward said stationary member and at least one groove in the adjacent surface of said stationary member, said groove having a portion registering with a portion of said row of cells and extending in an arcuate path circumferentially around the axis of rotation of said rotatable member to form an annular section and having an outlet opening for the lubricant intermediate the ends of said groove.

5. Means for increasing the pressure of lubricant between adjacent bearing surfaces of a bearing of the type comprising a rotatable member and a stationary member immersed in a lubricant, said means comprising cooperating configurations for developing pressure in the lubricant in response to rotation of said rotatable member and including at least one row of closely adjacent cells in the surface of said rotatable member open solely toward said stationary member and a plurality of grooves in the adjacent surface of said stationary member said grooves having a portion extending in an arcuate path circumferentially around the axis of rotation of said rotatable member to form an annular section and having an opening at one end.

6. Means for increasing the pressure of lubricant between adjacent bearing surface of a bearing of the type comprising a rotatable member and a stationary member immersed in a lubricant, said means comprising cooperating configurations for developing pressure in the lubricant in response to rotation of said rotatable member and including at least one row of closely adjacent cells in the surface of said rotatable member open solely toward said stationary member and a plurality of grooves in the adjacent surface of said stationary member said grooves having a portion extending in an arcuate path circumferentially around the axis of rotation of said rotatable member to form an annular section and having an opening at one end, said grooves extending generally parallel to one another.

7. Means for increasing the pressure of lubricant between adjacent bearing surfaces of a bearing of the type comprising a rotatable member and a stationary member immersed in a lubricant, said means comprising cooperating configurations for developing pressure in the lubricant in response to rotation of said rotatable member and including at least one row of cells in the surface of said rotatable member and a plurality of grooves in the adjacent surface of said stationary member said grooves having a portion extending in an arcuate path circumferentially around the axis of rotation of said rotatable member to form an annular section and having an opening at one end, said grooves extending generally parallel to one another, and being connected one to another.

8. Means for increasing the pressure of lubricant between adjacent bearing surfaces of a bearing of the type comprising a rotatable member and a stationary member immersed in a lubricant, said means comprising cooperating configurations for developing pressure in the lubricant in response to rotation of said rotatable member and including at least one circular row of cells in the surface of said rotatable member and at least one groove in the adjacent surface of said stationary member, said stationary member having the shape of a segment.

9. Means for increasing the pressure of lubricant between adjacent bearing surfaces of a bearing of the type comprising a rotatable member and a stationary member immersed in a lubricant, said means comprising cooperating configurations for developing pressure in the lubricant in response to rotation of said rotatable member and including at least one circular row of cells in the surface of said rotatable member and at least one groove in the adjacent surface of said stationary member, said groove having an arcuate portion registering with a portion of said row of cells and extending generally around the axis of rotation of said rotatable member to form an annular section and a suction valve provided at each end of said groove.

10. Means for increasing the pressure of lubricant between adjacent bearing surfaces of a bearing of the type comprising a rotatable member and a stationary member immersed in a lubricant, said means comprising cooperating configurations for developing pressure in the lubricant in response to rotation of said rotatable member and including at least one circular row of cells in the surface of said rotatable member and at least one groove in the adjacent surface of said stationary member, said groove having an arcuate portion registering with a portion of said row of cells and extending generally around the axis of rotation of said rotatable member to form an annular section and a suction valve arranged at one end of said groove and an over pressure valve arranged at the other end of said groove.

11. Means for increasing the pressure of lubricant between adjacent bearing surfaces of a bearing of the type comprising a rotatable member and a stationary member immersed in a lubricant, said means comprising cooperating configurations for developing pressure in the lubricant in response to rotation of said rotatable member and including at least one circular row of cells in the surface of said rotatable member and at least one groove in the adjacent surface of said stationary member, said groove having an arcuate portion registering with a portion of said row of cells and extending generally around the axis of rotation of said rotatable member to form an annular section and a slip ring packing disposed adjacent said rotatable member having a leakage collecting space for the lubricant in said rotatable member.

12. Means for increasing the pressure of lubricant between adjacent bearing surfaces in a thrust bearing of the type comprising an upper rotatable member and a lower stationary ring means immersed in a lubricant, said means comprising cooperating configurations for developing pressure in the lubricant in response to rotation of said rotatable member and including at least one groove having a portion extending in an arcuate path around the surface of said ring means to form an annular section and a circular row of closely adjacent cells disposed in the adjacent surface of said rotatable member.

13. Means for increasing the pressure of lubricant between adjacent bearing surfaces in a horizontal thrust bearing comprising a rotatable member including a shaft and opposite stationary wheels immersed in lubricant, said means comprising cooperating configurations for developing pressure in the lubricant in response to rotation of said rotatable member and including at least one circular row of closely adjacent cells in the surface of said rotatable member open solely toward said stationary wheels and arcuate grooves in the adjacent surfaces of said wheels forming annular sections, whereby the lubricant is fed under pressure to the space between said adjacent surfaces of said wheels and around said shaft.

References Cited in the file of this patent

UNITED STATES PATENTS

| | | |
|---|---|---|
| 1,436,265 | Kingsbury et al. | Nov. 21, 1922 |
| 1,619,286 | Burks | Mar. 1, 1927 |
| 1,640,591 | Borneman | Aug. 30, 1927 |
| 1,759,412 | Noble | May 20, 1930 |
| 2,081,063 | Oliver | May 18, 1937 |
| 2,289,053 | Watres | July 7, 1942 |
| 2,362,667 | Schmidt | Nov. 14, 1944 |

FOREIGN PATENTS

| | | |
|---|---|---|
| 158,759 | Great Britain | Feb. 17, 1921 |
| 539,753 | Great Britain | Sept. 23, 1941 |